United States Patent
Shen

(10) Patent No.: US 11,348,311 B2
(45) Date of Patent: May 31, 2022

(54) CONTENT DISPLAY METHOD, APPARATUS AND DEVICE FOR THREE-DIMENSIONAL SCENE

(71) Applicant: GOERTEK INC., Shandong (CN)

(72) Inventor: Zhixing Shen, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 17/266,923

(22) PCT Filed: Dec. 21, 2018

(86) PCT No.: PCT/CN2018/122535
§ 371 (c)(1),
(2) Date: Feb. 8, 2021

(87) PCT Pub. No.: WO2020/042461
PCT Pub. Date: Mar. 5, 2020

(65) Prior Publication Data
US 2021/0343078 A1 Nov. 4, 2021

(30) Foreign Application Priority Data

Aug. 31, 2018 (CN) .......................... 201811013509.4

(51) Int. Cl.
*G06T 19/20* (2011.01)
*G06T 17/10* (2006.01)
(Continued)

(52) U.S. Cl.
CPC .............. *G06T 17/10* (2013.01); *G06F 3/011* (2013.01); *G06T 13/20* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| 6,968,299 B1 | 11/2005 | Bernardini et al. |
| 2012/0047465 A1 | 2/2012 | Noda et al. |
| (Continued) | | |

FOREIGN PATENT DOCUMENTS

| CN | 102375539 A | 3/2012 |
| CN | 102930047 A | 2/2013 |
| (Continued) | | |

OTHER PUBLICATIONS

Croci, Simone, et al. "A framework for quality control in cinematic VR based on voronoi patches and saliency." 2017 International Conference on 3D Immersion (IC3D). IEEE, 2017. (Year: 2017).*

(Continued)

*Primary Examiner* — Vu Nguyen
(74) *Attorney, Agent, or Firm* — Workman Nydegger

(57) ABSTRACT

A content display method, apparatus and device. Said method comprises determining an initial position of a user in a VR scene (101); determining, in the VR scene, at least one object to be displayed and the display position of each of said objects in the VR scene (102); according to the display position of each of said objects and the initial position of the user, dividing the VR scene to obtain respective spatial boundaries of the user and each of said objects, and creating respective display spaces for the user and each of said objects (103); and displaying each of said objects in the respective display space (104). The three-dimensional scene-based content display method enables a user to be in a three-dimensional space at every moment, thus providing a better spatial immersion experience.

16 Claims, 5 Drawing Sheets

(51) Int. Cl.
    *G06F 3/01*     (2006.01)
    *G06T 13/20*    (2011.01)

(56)         References Cited

U.S. PATENT DOCUMENTS

2014/0218361 A1    8/2014  Abe et al.
2017/0054972 A1*   2/2017  Wang ................. G06F 3/04815
2017/0120148 A1*   5/2017  Yim ........................ G06F 3/011
2019/0197785 A1*   6/2019  Tate-Gans ............. G06T 19/006
2020/0035040 A1*   1/2020  Eschricht .............. G06F 3/1446
2020/0219318 A1    7/2020  Yin et al.

FOREIGN PATENT DOCUMENTS

CN      103336783  A      10/2013
CN      103970268  A       8/2014
CN      105120251  A      12/2015
CN      105183405  A      12/2015
CN      105807936  A       7/2016
CN      105892651  A       8/2016
CN      106598390  A       4/2017
CN      107329566  A      11/2017
CN      107957774  A       4/2018
CN      108053483  A       5/2018

OTHER PUBLICATIONS

International Search Report, English Translation, from Application No. PCT/CN2018/122535 filed Dec. 21, 2018, dated May 30, 2019.

* cited by examiner

CONTENT DISPLAY METHOD, APPARATUS AND DEVICE FOR THREE-DIMENSIONAL SCENE

This application claims the priority to Chinese Patent Application No. 201811013509.4, titled "CONTENT DISPLAY METHOD, APPARATUS AND DEVICE", filed on Aug. 31, 2018 with the Chinese Patent Office, which is incorporated herein by reference in its entirety.

FIELD

The present disclosure relates to the field of virtual reality technology, and in particular to a method, an apparatus and a device for displaying content.

BACKGROUND

With the development of VR (Virtual Reality) technology, VR devices are widely used.

Compared with the conventional screen display devices (such as mobile phones and tablets), the VR device may provide a panoramic display having a viewing angle within 360 degrees, so that the content can be displayed in a theoretically unlimited space. However, in the VR scenes displayed by the current VR device, the user watches VR videos or VR images to get a sense of space immersion. For the content (such as an application icon, a file list, a video thumbnail, a time icon and a weather icon) that the user may interact with, the scene design and environment layout are still provided in a plane, and are usually displayed on an operable platform for the user. The user may perform a sliding operation or a pull-up operation on the operable platform to switch the content displayed on the plane. Thus, the user experience is still limited to the experience of using conventional screen display devices and cannot be effectively improved.

SUMMARY

According to the embodiments of the present disclosure, a method, an apparatus and a device for displaying content are provided to display content in a three-dimensional scene, enabling the user to be in a three-dimensional space to get a better sense of space immersion.

According to the present disclosure, a method for displaying content is provided. The method includes:
  determining an initial position of a user in a VR scene;
  determining one or more to-be-displayed objects in the VR scene and a display position of each of the to-be-displayed objects in the VR scene;
  defining, based on the display position of each of the to-be-displayed objects and the initial position of the user, a space boundary respectively for the user and each of the to-be-displayed objects in the VR scene to create a display space respectively for the user and each of the to-be-displayed objects; and
  for each of the to-be-displayed objects, displaying the to-be-displayed object in the display space for the to-be-displayed object.

In some embodiments, the determining one or more to-be-displayed objects in the VR scene and a display position of each of the to-be-displayed objects in the VR scene includes:
  determining the initial position of the user as a center position, and establishing a virtual sphere with the center position as a center of the virtual sphere, where a radius of the virtual sphere is determined based on a viewing distance of the user;
  determining one or more to-be-displayed objects in the VR scene; and
  determining a display position of each of the to-be-displayed objects on a surface of the virtual sphere.

In some embodiments, the determining a display position of each of the to-be-displayed objects on a surface of the virtual sphere includes:
  determining the number of the one or more to-be-displayed objects;
  evenly dividing, based on the number of the one or more to-be-displayed objects, the surface of the virtual sphere into reference regions, where the number of the reference regions is equal to the number of the one or more to-be-displayed objects; and
  determining, for each of the to-be-displayed objects, a reference region and a display position in the reference region.

In some embodiments, the determining, for each of the to-be-displayed objects, reference region and a display position in the reference region includes:
  for each of the to-be-displayed objects,
    randomly determining a reference region for the to-be-displayed object; and
    randomly acquiring a reference position in the reference region as the display position of the to-be-displayed object.

In some embodiments, the defining, based on the display position of each of the to-be-displayed objects and the initial position of the user, a space boundary respectively for the user and each of the to-be-displayed objects in the VR scene to create a display space respectively for the user and each of the to-be-displayed object includes:
  defining, for each of the to-be-displayed objects, the display position of the to-be-displayed object as a target point, and defining the initial position of the user as a center point;
  determining a space boundary for each of target points by using a 3D Thiessen space division method;
  defining, for each of the target points, the space boundary for the center point by a perpendicular bisecting plane of a line segment connecting the target point and the center point; and
  creating, based on the space boundary for each of the target points and the space boundary for the center point, the display space respectively for the user and each of the to-be-displayed objects.

In some embodiments, the determining a space boundary for each of the target points by using a 3D Thiessen space division method includes:
  constructing a virtual triangulation based on all the target points by using a Delaunay triangulation method;
  generating, for each of triangles in the virtual triangulation, a perpendicular bisecting plane of each of sides of the triangle; and
  defining, for each of the target points, the space boundary for the target point by a perpendicular bisecting plane around the target point.

In some embodiments, after the displaying, for each of the to-be-displayed objects, the to-be-displayed object in the display space for the to-be-displayed object, the method further includes:
  determining a to-be-added display object in the VR scene and a display position of the to-be-added display object in the VR scene;

defining, based on the display position of each of the to-be-displayed objects, the display position of the to-be-added display object and the initial position of the user, the space boundary respectively for the user, each of the to-be-displayed objects in the VR scene and the to-be-added display object in the VR scene to create a display space respectively for the user, each of the to-be-displayed objects and the to-be-added display object; and displaying, for each of the to-be-displayed objects, the to-be-displayed object in the display space for the to-be-displayed object, and displaying the to-be-added display object in the display space for the to-be-added display object.

In some embodiments, after the displaying, for each of the to-be-displayed objects, the to-be-displayed object in the display space for the to-be-displayed object, the method further includes:

determining a to-be-deleted object in the one or more to-be-displayed objects;

defining, based on the initial position of the user and the display position of each of the to-be-displayed objects except the to-be-deleted object, the space boundary respectively for the user and each of the to-be-displayed objects except the to-be-deleted object in the VR scene to create a display space respectively for the user and each of the to-be-displayed objects except the to-be-deleted object; and displaying, for each of the to-be-displayed objects except the to-be-deleted object, the to-be-displayed object in the display space for the to-be-displayed object.

In some embodiments, the displaying, for each of the to-be-displayed objects, the to-be-displayed object in the display space for the to-be-displayed object includes:

for each of the to-be-displayed objects,
determining a display form for the to-be-displayed object; and
fixedly displaying the to-be-displayed object in the display form at a display position in the display space for the to-be-displayed object, or dynamically displaying the to-be-displayed object in the display form at a display position in the display space for the to-be-displayed object.

In some embodiments, after the displaying, for each of the to-be-displayed objects, the to-be-displayed object in the display space for the to-be-displayed object, the method further includes:

receiving a movement request from the user for any one of the to-be-displayed objects;

determining a moving position of the to-be-displayed object and determining the moving position as the display position of the to-be-displayed object;

defining, based on the display position of each of the to-be-displayed objects and the initial position of the user, the space boundary for the user in the VR scene and the space boundary for each of the to-be-displayed objects in the VR scene to update the display space for the user and the display space for each of the to-be-displayed objects; and displaying, for each of the to-be-displayed objects, the to-be-displayed object in the updated display space for the to-be-displayed object.

In some embodiments, the method further includes:

saving, for each of the to-be-displayed objects, the display position of the to-be-displayed object configured by the user to display the to-be-displayed object at the display position configured by the user every time.

In some embodiments, after the displaying, for each of the to-be-displayed objects, the to-be-displayed object in the display space, the method further includes:

receiving an interaction request from the user for any one of the to-be-displayed objects;

determining the to-be-displayed object as an interaction object;

moving the interaction object in a form to the display space for the user;

receiving a trigger request generated by the user for the interaction object; and jumping to a VR scene generated by the interaction object in response to the triggering request.

In some embodiments, the display form includes a three-dimensional model, a thumbnail, or an animation.

In some embodiments, after the moving the interaction object in a form to the display space for the user, the method further includes:

defining, based on the initial position of the user and the display position of each of the to-be-displayed objects except the interaction object, the space boundary respectively for the user and each of the to-be-displayed objects except the interaction object in the VR scene to create a display space respectively for the user and each of the to-be-displayed objects except the interaction object; and displaying, for each of the to-be-displayed objects except the interaction object, the to-be-displayed object in the display space for the to-be-displayed object.

In some embodiments, the displaying, for each of the to-be-displayed objects, the to-be-displayed object in the display space for the to-be-displayed object includes:

for each of the to-be-displayed objects,
determining a display theme for the display space of the to-be-displayed object;
determining, based on the display theme for the display space, a display form for the to-be-displayed object corresponding to the display space; and
displaying the to-be-displayed object in the display form in the display space configured based on the display theme.

According to the present disclosure, an apparatus for displaying content is provided. The apparatus includes: a first determination module, a second determination module, a space boundary definition module, and a display module.

The first determination module is configured to determine an initial position of a user in a VR scene.

The second determination module is configured to determine one or more to-be-displayed objects in the VR scene and a display position of each of the to-be-displayed objects in the VR scene.

The space boundary definition module is configured to define, based on the display position of each of the to-be-displayed objects and the initial position of the user, a space boundary respectively for the user and each of the to-be-displayed objects in the VR scene to create a display space respectively for the user and each of the to-be-displayed objects.

The display module is configured to display, for each of the to-be-displayed objects, the to-be-displayed object in the display space for the to-be-displayed object.

According to the present disclosure, a device for displaying content is further provided. The device includes a processing component and a storage component. The storage component stores one or more computer program instructions. The processing component is configured to invoke and execute the one or more computer program instructions to:

> determine an initial position of a user in a VR scene;
>
> determine one or more to-be-displayed objects in the VR scene and a display position of each of the to-be-displayed objects in the VR scene;
>
> define, based on the display position of each of the to-be-displayed objects and the initial position of the user, a space boundary respectively for the user and each of the to-be-displayed objects in the VR scene to create a display space respectively for the user and each of the to-be-displayed objects; and
>
> display, for each of the to-be-displayed objects, the to-be-displayed object in the display space for the to-be-displayed object.

According to the embodiments of the present disclosure, a method, an apparatus and a device for displaying content are provided. In the present disclosure, an initial position of a user in a VR scene is determined; one or more to-be-displayed objects in the VR scene and a display position of each of the to-be-displayed objects in the VR scene are determined; based on the display position of each of the to-be-displayed objects and the initial position of the user, a space boundary respectively for the user and each of the to-be-displayed objects in the VR scene is defined to create a display space respectively for the user and each of the to-be-displayed objects; and for each of the to-be-displayed objects, the to-be-displayed object is displayed in the display space for the to-be-displayed object. With the present disclosure, the user can feel multiple spaces, and the user, when interacting with a to-be-displayed object, feels like interacting with the to-be-displayed object in two different spaces, thereby getting a sense of space immersion all the time.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. Apparently, the drawings in the following descriptions are only some embodiments of the present disclosure, and other drawings may be obtained by those skilled in the art according to these drawings without any creative work.

DETAILED DESCRIPTION

In order to enable those skilled in the art to better understand the technical solutions according to the present disclosure, the technical solutions according to the embodiments of the present disclosure are described clearly and completely in conjunction with the drawings in the embodiments of the present disclosure.

In some processes described in the description, claims and the drawings of the present disclosure, multiple operations in a certain order are included. However, it should be understood that the operations may be performed out of the order in which these operations are described in the present disclosure or may be performed in parallel. The sequence numbers, such as 101 and 102, are only used to distinguish different operations and do not represent any execution order. In addition, these processed may include more or fewer operations, and these operations may be performed sequentially or in parallel. It should be noted that the descriptions such as "first" and "second" in the present disclosure are only used to distinguish different messages, devices, and modules, rather than to represent a sequence or to limit that the "first" and the "second" are different types.

The technical solutions according to the present disclosure are described in detail below in conjunction with the drawings.

Figure 1:
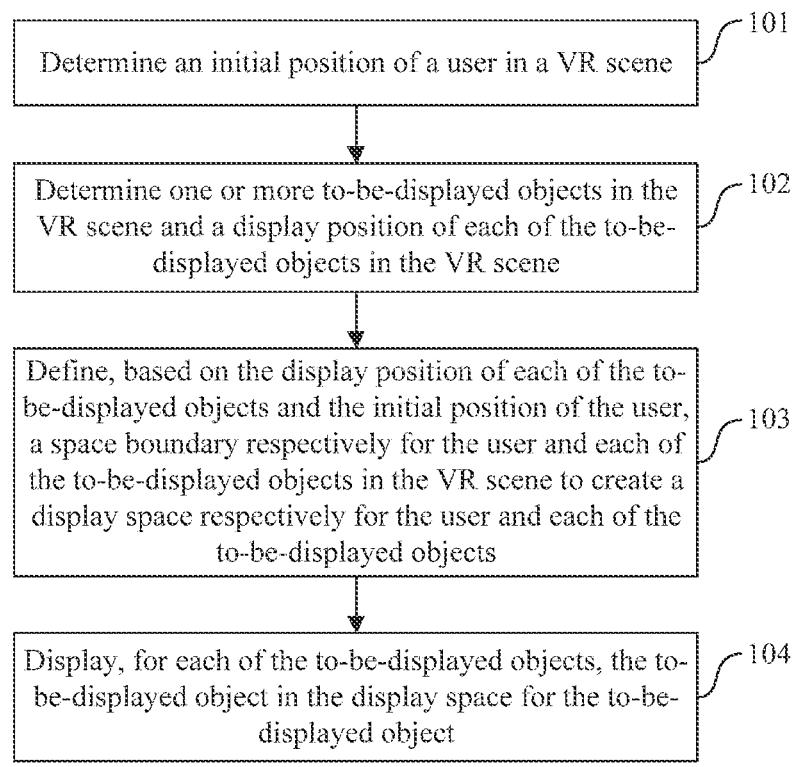
FIG. 1 shows a flow chart of a method for displaying content according to an embodiment of the present disclosure.

FIG. 1 shows a flow chart of a method for displaying content according to an embodiment of the present disclosure. The method may include the following steps 101 to 104.

In step 101, an initial position of a user in a VR scene is determined.

The VR (virtual reality) scene may be any virtual scene presented after a VR device is turned on, which is not limited herein. The initial position of the user in different virtual scenes may be different. Therefore, it is required to determine the initial position of the user in different VR scenes.

In step 102, one or more to-be-displayed objects in the VR scene and a display position of each of the to-be-displayed objects in the VR scene are determined.

In practices, the to-be-displayed object may be any content, such as an application installed in the VR device, a picture list thumbnail, a video thumbnail, a file list, an address book, time, and weather, which the user may interact with.

The display position of each of the to-be-displayed objects may be a default display position in the system, or may be any display position that is randomly selected in the VR scene every time the VR scene is presented, or may be a fixed display position in the VR scene set by the user according to the usage requirements, which is not limited herein.

In step 103, based on the display position of each of the to-be-displayed objects and the initial position of the user, a space boundary respectively for the user and each of the to-be-displayed objects in the VR scene is defined to create a display space respectively for the user and each of the to-be-displayed objects.

In order to perform space division in the VR scene, a Thiessen polygon method may be used in performing three-dimensional space division to form a 3D (three-dimensional) Thiessen space, Specifically, the process, in which based on the display position of each of the to-be-displayed objects and the initial position of the user, a space boundary respectively for the user and each of the to-be-displayed objects in the VR scene is defined to create a display space respectively for the user and each of the to-be-displayed objects, may include:

defining, for each of the to-be-displayed objects, the display position of the to-be-displayed object as a target point, and defining the initial position of the user as a center point;

determining a space boundary for each of target points by using a 3D Thiessen space division method;

defining, for each of the target points, the space boundary for the center point by a perpendicular bisecting plane of a line segment connecting the target point and the center point; and creating, based on the space boundary for each of the target points and the space boundary for the center point, the display space respectively for the user and each of the to-be-displayed objects.

Figure 2:
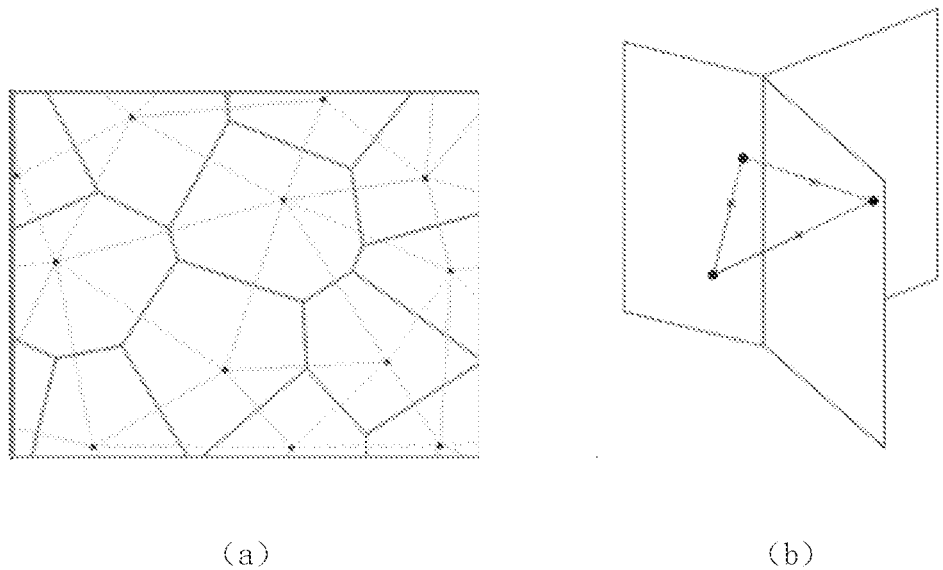
FIG. 2(a) and FIG. 2(b) respectively show a schematic diagram of a Thiessen polygon division method and a 3D Thiessen space division method according to the present disclosure.

As shown in FIG. 2(a), Thiessen polygons are obtained by dividing the space based on N discrete points. Each of the discrete points is connected to a discrete point closest to the discrete point, and three discrete points nearest to each other are connected to form a triangle. Each of the discrete points may serve as a vertex of multiple triangles. The N discrete points are connected to each other to form a Delaunay triangulation in which every two triangles are adjacent, have common sides, and do not overlap. Perpendicular bisectors of all sides of all the triangles having a common vertex intersect to form a Thiessen polygon.

Based on the Thiessen polygon method, improvement is performed in the 3D Thiessen space division method. After the N discrete points are connected to each other to form a Delaunay triangulation in which every two triangles are adjacent, have common sides, and do not overlap, perpendicular bisecting planes of all sides of all the triangles intersect to form three-dimensional Thiessen spaces. Each of the discrete points is located in an independent space, and spaces where adjacent discrete points are located are adjacent. As shown in FIG. 2(b), a triangle is formed by connecting three discrete points in space, and each of the discrete points is located in an independent space formed by the perpendicular bisecting planes of the sides of the triangle. The perpendicular bisecting planes intersect on a line, and the center of the triangle is located on this line.

Thus, a display space may be created for each the to-be-displayed objects by using the 3D Thiessen space division method. The process of determining a space boundary for each of target points by using the 3D Thiessen space division method may include:

constructing a virtual triangulation based on all the target points by using a Delaunay triangulation method;

generating, for each of triangles in the virtual triangulation, a perpendicular bisecting plane of each of sides of the triangle; and defining, for each of the target points, the space boundary for the target point by a perpendicular bisecting plane around the target point.

With the 3D Thiessen space division method, a virtual triangulation is formed based on all the target points, then for each of triangles in the virtual triangulation, a perpendicular bisecting plane of each of sides of the triangle is generated. For example, if the target point serves as a vertex of seven virtual triangles, there are seven perpendicular bisecting planes adjacent to the target point, and the space boundary for the to-be-displayed object corresponding to the target point is formed by the seven perpendicular bisecting planes intersecting with each other.

For each of the target points, a perpendicular bisecting plane of a line segment connecting the target point and the center point corresponding to the user is generated, and the space boundary for the user is formed by all the perpendicular bisecting planes intersecting with each other. Thus, when the user at the initial position turns to a display space of any one of the to-be-displayed objects, the user always directly faces the display space of the to-be-displayed object.

In step 104, for each of the to-be-displayed objects, the to-be-displayed object is displayed in the display space for the to-be-displayed object.

In some embodiments, the process of displaying, for each of the to-be-displayed objects, the to-be-displayed object in the display space for the to-be-displayed object may include: determining a display form for each of the to-be-displayed objects.

In practices, the display form of the to-be-displayed object may include a three-dimensional model, a thumbnail, or an animation.

The three-dimensional model may be displayed by a 3D component, such as a 3D squirrel eating pine nuts or a flying 3D bird, which is not limited herein. The user may interact with the 3D component. For example, when the user touches the 3D component, the 3D squirrel stops eating pine nuts or the 3D bird stays still. The display form may be configured by the designer according to imagination. The user may select a three-dimensional model provided by the VR device or download a three-dimensional model from the internet to configure the display form of the to-be-displayed object.

The to-be-displayed object may be displayed in the display space for the to-be-displayed object in a form of a thumbnail, such as a video thumbnail, a picture thumbnail or a file thumbnail.

The to-be-displayed object may be displayed in a form of an animation or an icon in the display space for the to-be-displayed object. For each of the to-be-displayed object, an animation or an icon may be configured. In addition, for the to-be-displayed object in the same animation, different animation effects may be configured. It should be understood that, the display form of the to-be-displayed object includes but is not limited to the above display forms, and any achievable display form may be used in the present disclosure, which is not limited herein.

For each of the to-be-displayed objects, the to-be-displayed object is fixedly displayed in the display form at a display position in the display space for the to-be-displayed object or dynamically displayed in the display form at a display position in the display space for the to-be-displayed object.

For each of the to-be-displayed objects, after the display form for the to-be-displayed object is configured, the to-be-displayed object may be fixedly displayed at a display position in the display space for the to-be-displayed object, or may be fixedly displayed by random at a position in the display space for the to-be-displayed object, or may be dynamically displayed at a position in the display space for the to-be-displayed object. For example, in a case that the to-be-displayed object is displayed in a form of a three-dimensional model which is a 3D bird spreading wings, it may be configured that the 3D bird spreading wings flies along a predetermined route or a random route in the display space and the 3D bird stays at a current position only when the user triggers the display space or triggers the 3D bird. In practices, the display form of the to-be-displayed object may be configured by the user or be randomly matched for the to-be-displayed object, which is not limited herein.

In some embodiments, the process of displaying, for each of the to-be-displayed objects, the to-be-displayed object in the display space for the to-be-displayed object may include:
for each of the to-be-displayed objects,
determining a display theme for the display space of the to-be-displayed object;
determining, based on the display theme for the display space, a display form for the to-be-displayed object corresponding to the display space; and
displaying the to-be-displayed object in the display form in the display space configured based on the display theme.

In practices, space themes, such as a space theme, a marine theme, a forest theme, a city theme, and a sky theme, may be configured for different display spaces, achieving interesting, diverse and hierarchical VR scenes. In a case that a space theme is configured for a display space, a universe background, a star revolving or rotating, and a galaxy far away from the view of the user may be configured in the display space to create a three-dimensional space scene, and the display form of the to-be-displayed object corresponding to the display space may be configured as a spaceship flying in space or a moving star. Similarly, a marine theme may be configured for the display space, and the display form of the to-be-displayed object corresponding to the display space may be configured as a whale swimming in the sea or a ship sailing in the sea, which are not be listed herein.

The space theme for the display space may be provided by the VR device or may be downloaded and saved locally by the user. The space theme and the display form of the to-be-displayed object corresponding to the display space may be configured by the user or be randomly matched, which are not limited herein.

In practices, after the display position of the to-be-displayed object is determined, the division of the display space may be determined. Therefore, if the display position of the to-be-displayed object is configured according to the system default configuration or configured by the user, the user sees the same boundary distribution of the display space in the VR scene every time; and if the display position of the to-be-displayed object is configured randomly, the user sees a different boundary distribution of the display space in the VR scene every time.

In the embodiments of the present disclosure, based on the display position of each of the to-be-displayed objects and the initial position of the user in the VR scene, the space boundary is defined to create a display space respectively for the user and each of the to-be-displayed objects, so that for each of the to-be-displayed objects, the to-be-displayed object is displayed in the display space for the to-be-displayed object. In addition, a 3D Thiessen space division method is further provided to divide the space in the VR scenes regularly. With the present disclosure, the user can feel multiple spaces, and the user, when interacting with a to-be-displayed object, feels like interacting with the to-be-displayed object in two different spaces, thereby getting a sense of space immersion all the time.

Figure 3:
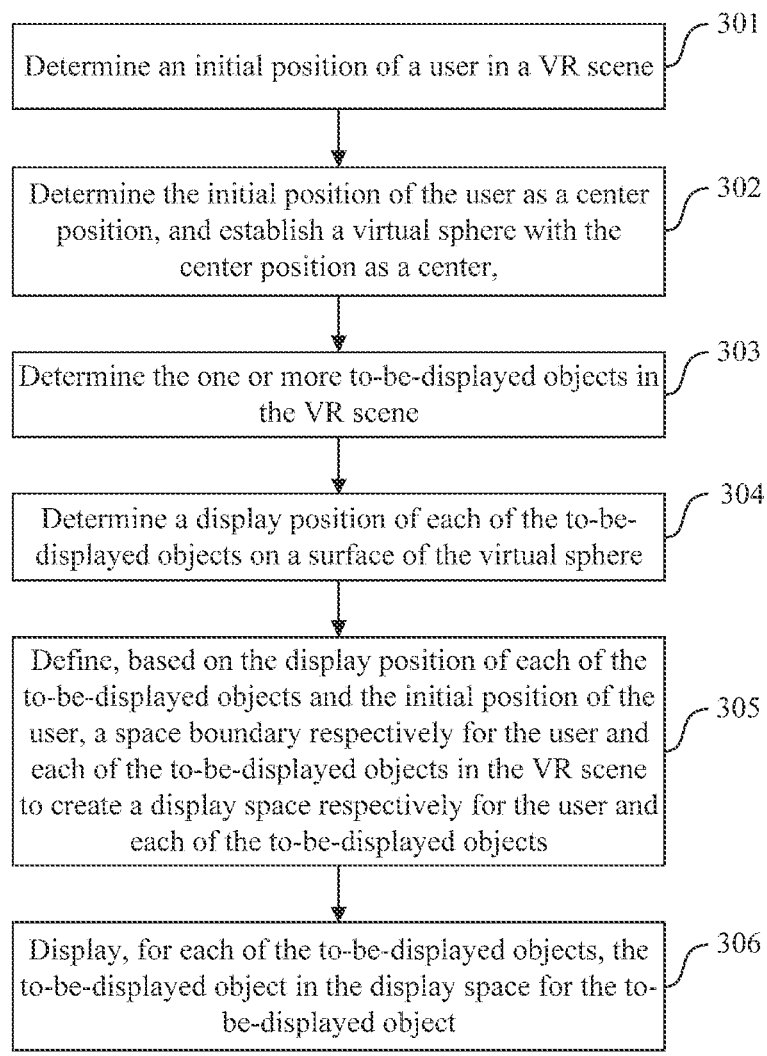
FIG. 3 shows a flow chart of a method for displaying content according to another embodiment of the present disclosure.

FIG. 3 shows a flow chart of a method for displaying content according to another embodiment of the present disclosure. The method may include the following steps 301 to 306.

In step 301, an initial position of a user in a VR scene is determined.

In step 302, the initial position of the user is determined as a center position, and a virtual sphere with the center position as a center is established.

In order to enable the user to obtain a better viewing experience, the to-be-displayed object is displayed within a best viewing distance range of the user. In an embodiment, the display position of the to-be-displayed object may be arranged on a surface of a virtual sphere which is established with the initial position of the user as the center of the virtual sphere and the best viewing distance of the user as the radius of the virtual sphere. The best viewing distance of the user may be configured according to a default best viewing distance or be configured by the user.

The radius of the virtual sphere is determined based on the viewing distance of the user. In practices, to ensure that the user obtains the best visual experience, the step of determining the initial position of the user as a center position and establishing a virtual sphere with the center position as a center may include:
determining the initial position of the user as a center position;
determining whether the user sets a user viewing distance;
establishing a virtual sphere with the center position as the center of the virtual sphere and with the user viewing distance as the radius of the virtual sphere if the user sets the user viewing distance; and
establishing a virtual sphere with the center position as the center of the virtual sphere and with the default viewing distance as the radius of the virtual sphere if the user does not set the user viewing distance.

In step 303, one or more to-be-displayed objects in the VR scene are determined.

In step 304, a display position of each of the to-be-displayed objects on the surface of the virtual sphere is determined.

By arranging the display position of each of the to-be-displayed objects on the surface of the virtual sphere which is established with the user viewing distance as the radius, the user obtains the best viewing experience.

Further, in a case that there are multiple to-be-displayed objects, in order to ensure an even space distribution in the VR scene to prevent the user from feeling that the to-be-displayed objects are crowded and chaotically arranged on the surface of the virtual sphere, in some embodiments, the process of determining a display position of each of the to-be-displayed objects on a surface of the virtual sphere may include:
determining the number of the one or more to-be-displayed objects;
evenly dividing, based on the number of the one or more to-be-displayed objects, the surface of the virtual sphere into reference regions, where the number of the reference regions is equal to the number of the one or more to-be-displayed objects; and
determining, for each of the to-be-displayed objects, a reference region and a display position in the reference region.

For each of the to-be-displayed objects, after the reference region is determined, the display position in the reference region is determined. In an embodiment, the process of determining, for each of the to-be-displayed objects, a reference region and a display position in the reference region may include:
for each of the to-be-displayed objects,
randomly determining a reference region for the to-be-displayed object; and randomly acquiring a reference position in the reference region as the display position of the to-be-displayed object.

In practices, the method is applied to cases in which there are multiple to-be-displayed objects. In a case that the number of the to-be-displayed object is one, it is unnecessary to divide the surface of the virtual sphere, that is, this step may be omitted, and any position on the surface of the virtual sphere may be determined as the display position of the to-be-displayed object. In a case that the number of the to-be-displayed object is N, the surface of the virtual sphere is evenly divided into N reference regions, and for each of the to-be-displayed objects, a reference regions may be configured by the user or be randomly matched. For each of the to-be-displayed objects, after the reference region is determined, any reference position in the reference region may be selected as the display position of the to-be-displayed object, which is not limited herein.

In step 305, based on the display position of each of the to-be-displayed objects and the initial position of the user, a space boundary respectively for the user and each of the to-be-displayed objects in the VR scene is defined to create a display space respectively for the user and each of the to-be-displayed objects.

Since the display position of each of the to-be-displayed objects is determined on the surface of the virtual sphere, the defined space boundaries for the to-be-displayed objects intersect at the center of the virtual sphere. In addition, for each of the display spaces, the user faces the perpendicular bisecting plane of the line segment connecting the to-be-displayed object corresponding to the display space and the center of the virtual sphere, the user always faces the to-be-displayed object that the user turns to.

In step 306, for each of the to-be-displayed objects, the to-be-displayed object is displayed in the display space for the to-be-displayed object.

In the embodiments of the present disclosure, in order to distribute the display spaces for the to-be-displayed objects evenly and regularly to meet the viewing experience of the user, a virtual sphere with the center position of the user as the center is established, and the radius of the virtual sphere is configured based on the viewing distance of the user to be within a comfortable distance for the user to watch. Thus, the display position of each of the to-be-displayed objects is arranged on the surface of the virtual sphere, and the reference region for each of the to-be-displayed objects is obtained by evenly dividing the surface of the virtual sphere, ensuring an even and regular distribution of the display space in the VR scene, thereby improving the viewing experience of the user.

Figure 4:
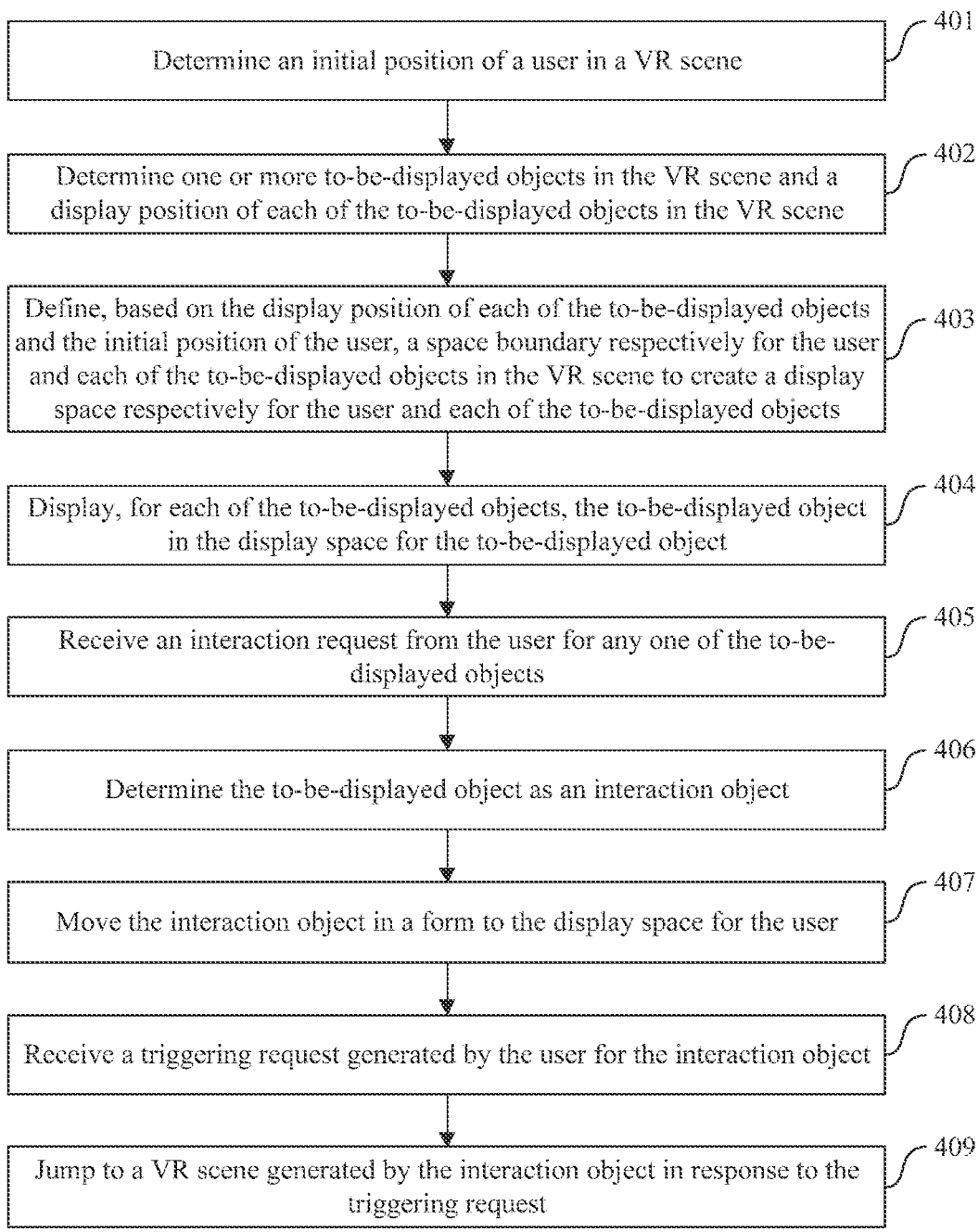
FIG. 4 shows a flow chart of a method for displaying content according to another embodiment of the present disclosure.

FIG. 4 shows a flow chart of a method for displaying content according to another embodiment of the present disclosure. The method may include the following steps 401 to 409.

In step 401, an initial position of a user in a VR scene is determined.

In step 402, one or more to-be-displayed objects in the VR scene and a display position of each of the to-be-displayed objects in the VR scene are determined.

In step 403, based on the display position of each of the to-be-displayed objects and the initial position of the user, a space boundary respectively for the user and each of the to-be-displayed objects in the VR scene is defined to create a display space respectively for the user and each of the to-be-displayed objects.

In step 404, for each of the to-be-displayed objects, the to-be-displayed object is display in the display space for the to-be-displayed object.

After all the to-be-displayed objects are displayed in respective display spaces, the user may interact with any one of the to-be-displayed objects displayed in the VR scene.

Specifically, the user may configure a user image, such as a form of a 3D model, to be displayed in the display space for the user. For example, the user may be displayed as a three-dimensional animation image or a three-dimensional cartoon character, such as Snow White, Ultraman or Spiderman. Apparently, the user may be displayed as any other user image. In addition, the user may configure different skins, expressions, or actions for the displayed animation character, which is not limited herein. In the display space for the user, the user image may move with the user's actual actions such as shaking head, raising head, and blinking, or even may simulate the body movements of the user by using a sensor arranged on the body of the user.

In step 405, an interaction request from the user for any one of the to-be-displayed objects is received.

When the user triggers a space boundary for any one of the to-be-displayed objects or triggers the any one of the to-be-displayed objects, an interaction request for the to-be-displayed object is generated. For example, in the VR scene, the user may operate the user image displayed in the VR scene to touch a space boundary for any one of the to-be-displayed objects, trigger any one of the to-be-displayed objects, or staring at any one of the to-be-displayed objects to generate the interaction request for the to-be-displayed object. The to-be-displayed object may be triggered in various ways, which are not limited herein.

In step 406, the to-be-displayed object is determined as an interaction object.

In step 407, the interaction object is moved in a form to the display space for the user.

Based on the interaction request, the VR device determines the to-be-displayed object as an interaction object. The interaction object, wrapped in a 3D component such as a transparent sphere (like a crystal ball), is moved to the display space for the user. The interaction object may be wrapped in a 3D component such as a gift box and a golden egg to be moved to the display space for the user. The interaction object may be moved in any form, which is not limited herein.

In step 408, a triggering request generated by the user for the interaction object is received.

In step 409, a VR scene generated by the interaction object is jumped to in response to the triggering request.

If the user wants to obtain the to-be-displayed object, the user may operate the user image to grab the 3D component and perform an operation such as throwing up the 3D component or dropping the 3D component to the ground to generate a trigger request for the interaction object. In a case that the interaction object is an application, the VR scene corresponding to the interface of the application is triggered to be opened. In a case that the interaction object is a video thumbnail, a picture thumbnail or the like, the user may further select a video or a picture to enter into the VR scene corresponding to the picture or the video to watch the picture or the video. Other cases are not listed herein.

In practices, in a case that the interaction object selected by the user is moved to the display space for the user, the display space for the interaction object may be automatically occupied by multiple display spaces around the display space, which follows the rule according to the 3D Thiessen Space division method. In some embodiments, after the interaction object is moved in a form to the display space for the user, the method may further include:

defining, based on the initial position of the user and the display position of each of the to-be-displayed objects except the interaction object, the space boundary respectively for the user and each of the to-be-displayed objects except the interaction object in the VR scene to create a display space respectively for the user and each of the to-be-displayed objects except the interaction object; and displaying, for each of the to-be-displayed objects except the interaction object, the to-be-displayed object in the display space for the to-be-displayed object.

It should be understood that, the user may add or delete a to-be-displayed object according to actual requirements. For example, in a case that the user downloads or uninstalls an application, it is required to add or delete the application, and it is required to create a display space for the application or delete a display space for the application, which follows the rule according to the 3D Thiessen space division method.

In some embodiments, after the process of displaying, for each of the to-be-displayed objects, the to-be-displayed object in the display space for the to-be-displayed object, the method may further include:

determining a to-be-added display object in the VR scene and a display position of the to-be-added display object in the VR scene;

defining, based on the display position of each of the to-be-displayed objects, the display position of the to-be-added display object and the initial position of the user, the space boundary respectively for the user, each of the to-be-displayed objects and the to-be-added display object in the VR scene to create a display space respectively for the user, each of the to-be-displayed objects and the to-be-added display object; and displaying, for each of the to-be-displayed objects, the to-be-displayed object in the display space for the to-be-displayed object, and displaying the to-be-added display object in the display space for the to-be-added display object.

In practices, the display position of the to-be-added display object may be determined by the user or be randomly matched. Corresponding to the determination process by the user, the user in the VR scene may throw the to-be-added display object to a position on the surface of the virtual sphere or to a position in the VR scene. The position where the to-be-added display object stops is determined as the display position of the to-be-added display object. Based on the space boundary division method according to any one of the above embodiments, the space boundary respectively for each of the to-be-displayed objects and each of the to-be-displayed objects is determined. Corresponding to the above process, in the VR scene, a new display space is created automatically al the position where the to-be-added display object stops, and multiple original display spaces around the new display space automatically shrink the space boundaries until the boundary of the new display space meets the rule according to the 3D Thiessen space division method.

In some embodiments, after the process of displaying, for each of the to-be-displayed objects, the to-be-displayed object in the display space for the to-be-displayed object, the method may further include:

determining a to-be-deleted object in the one or more to-be-displayed objects;

defining, based on the initial position of the user and the display position of each of the to-be-displayed objects except the to-be-deleted object, a space boundary respectively for the user and each of the to-be-displayed objects except the to-be-deleted object in the VR scene to create a display space respectively for the user and each of the to-be-displayed objects except the to-be-deleted object; and displaying, for each of the to-be-displayed objects except the to-be-deleted display object, the to-be-displayed object in the display space for the to-be-displayed object.

In a case that the user wants to delete a to-be-displayed object displayed in the current VR scene, the user may trigger a deletion operation for the to-be-displayed object. The deletion operation may be performed by throwing, by the user, a special effect bomb to the display space for the to-be-deleted object. When the special effect bomb explodes, the display space is blown up and the to-be-deleted object corresponding to the display space disappears. The display space for the to-be-deleted object is automatically occupied by multiple display spaces around the display space. Apparently, the above process is only a special effect of the deletion operation, which is not limited to the above process. The deletion operation follows the rule according to the 3D Thiessen space division method.

In practices, the user may configure and modify the display form of any one of the to-be-displayed objects and the theme of the display space for any one of the to-be-displayed objects, and the user may add or delete any one of the to-be-displayed objects, which are not limited herein.

It should be understood that, if the user is not satisfied with the display position of any one of the to-be-displayed objects displayed currently, the user may change the display position of the to-be-displayed object according to the user's wishes. After the process of displaying, for each of the to-be-displayed objects, the to-be-displayed object in the display space for the to-be-displayed object, the method may further include:

receiving a movement request from the user for any one of the to-be-displayed objects;

determining a moving position of the to-be-displayed object and determining the moving position as the display position of the to-be-displayed object;

defining, based on the display position of each of the to-be-displayed objects and the initial position of the user, the space boundary respectively for the user and each of the to-be-displayed objects in the VR scene to update the display space for the user and the display space for each of the to-be-displayed objects; and displaying, for each of the to-be-displayed objects, the to-be-displayed object in the updated display space for the to-be-displayed object.

In an actual VR scene, the user may directly move a to-be-displayed object to a display position required by the user. The original display space for the to-be-displayed object is automatically filled by multiple display spaces around the original display space. At the display position of the to-be-displayed object after being moved, the display spaces around the moved to-be-displayed object automatically shrinks until the boundary of a new space for the moved to-be-displayed object meets the rule according to the 3D Thiessen space division method.

After the to-be-displayed object is moved in the above way and the display position of each of the to-be-displayed objects is automatically configured, the current configuration by the user may be saved. In some embodiments, the method may further include:

saving, for each of the to-be-displayed objects, the display position of the to-be-displayed object configured by the user to display the to-be-displayed object at the display position configured by the user every time.

The process of saving, for each of the to-be-displayed objects, the display position of the to-be-displayed object configured by the user indicates that the space division in the VR scene is saved, such that the to-be-displayed object may be displayed in the VR scene according to a fixed space division.

The method for displaying content according to the embodiments of the present disclosure may be applied to a Launcher (an android desktop) interface or a menu interface of a game, and space games such as a space maze game may be developed based on the method. With the method, the user in the VR scene can experience a sense of space that cannot be experienced in the real world, and the advantages of VR devices are fully utilized, achieving the superiority that cannot be achieved by the conventional technology. With the method, the user in the VR scene is in a 3D space without facing a flat console, as if in space and facing the infinite universe, thereby getting a better sense of space immersion.

Figure 5:
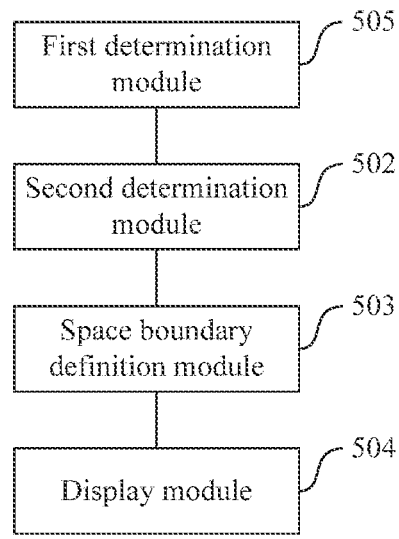
FIG. 5 shows a schematic structural diagram of an apparatus for displaying content according to an embodiment of the present disclosure.

FIG. 5 shows a schematic structural diagram of an apparatus for displaying content according to an embodiment of the present disclosure. The apparatus may include a first determination module 501, a second determination module 502, a space boundary definition module 503 and a display module 504.

The first determination module 501 is configured to determine an initial position of a user in a VR scene.

The VR scene may be any virtual scene presented after a VR device is turn on, which is not limited herein. The initial position of the user in different virtual scenes may be different. Therefore, it is required to determine the initial position of the user in different VR scenes.

The second determination module 502 is configured to determine one or more to-be-displayed objects in the VR scene and a display position of each of the to-be-displayed objects in the VR scene.

In practices, the to-be-displayed object may be any content, such as an application installed in the VR device, a picture list thumbnail, a video thumbnail, a file list, an address book, time, and weather, which the user may interact with.

The display position of each of the to-be-displayed objects may be a default display position in the system, or may be any display position that is randomly selected in the VR scene every time the VR scene is presented, or may be a fixed display position in the VR scene set by the user according to the usage requirements, which is not limited herein.

The space boundary definition module 503 is configured to define, based on the display position of each of the to-be-displayed objects and the initial position of the user, a space boundary respectively for the user and each of the to-be-displayed objects in the VR scene to create a display space respectively for the user and each of the to-be-displayed objects.

In order to perform space division in the VR scene, a Thiessen polygon method may be used in performing three-dimensional space division to form a 3D (three-dimensional) Thiessen space. In an embodiment, the space boundary definition module 503 may include a conversion unit 511, a first space boundary determination unit 512, a second space boundary determination unit 513 and a display space determination unit 514.

The conversion unit 511 is configured to define, for each of the to-be-displayed objects, the display position of the to-be-displayed object as a target point, and define the initial position of the user as a center point.

The first space boundary determination unit 512 is configured to determine a space boundary for each of target points by using a 3D Thiessen space division method.

The second space boundary determination unit 513 is configured to define, for each of the target points, the space boundary for the center point by a perpendicular bisecting plane of a line segment connecting the target point and the center point.

The display space determination unit 514 is configured to create, based on the space boundary for each of the target points and the space boundary for the center point, the display space respectively for the user and each of the to-be-displayed objects.

The first space boundary determination unit 512 may be configured to:
  construct a virtual triangulation based on all the target points by using a Delaunay triangulation method;
  generate, for each of triangles in the virtual triangulation, a perpendicular bisecting plane of each of sides of the triangle; and
  define, for each of the target points, the space boundary for the target point by a perpendicular bisecting plane around the target point.

With the 3D Thiessen space division method, a virtual triangulation is formed based on all the target points, then for each of triangles in the virtual triangulation, a perpendicular bisecting plane of each of sides of the triangle is generated. For example, if the target point serves as a vertex of seven virtual triangles, there are seven perpendicular bisecting planes adjacent to the target point, and the space boundary for the to-be-displayed object corresponding to the target point is formed by the seven perpendicular bisecting planes intersecting with each other.

For each of the target points, a perpendicular bisecting plane of a line segment connecting the target point and the center point corresponding to the user is generated, and the space boundary for the user is formed by all the perpendicular bisecting planes intersecting with each other. Thus, when the user at the initial position turns to a display space of any one of the to-be-displayed objects, the user always directly faces the display space of the to-be-displayed object The first display module 504 is configured to display, for each of the to-be-displayed objects, the to-be-displayed object in the display space for the to-be-displayed object.

In some embodiments, the display module 504 may be configured to:
  for each of the to-be-displayed objects,
    determine a display form for the to-be-displayed object; and
    fixedly display the to-be-displayed object in the display form at a display position in the display space for the to-be-displayed object, or dynamically display the to-be-displayed object in the display form at a display position in the display space for the to-be-displayed object.

In practices, the display form may include a three-dimensional model, a thumbnail, or an animation.

In some embodiments, the display module 504 may be configured to:
  for each of the to-be-displayed objects,
    determine a display theme for the display space of the to-be-displayed object;
    determine, based on the display theme for the display space, a display form for the to-be-displayed object corresponding to the display space; and display the to-be-displayed object in the display form in the display space configured based on the display theme.

In practices, after the display position of the to-be-displayed object is determined, the division of the display space may be determined. Therefore, if the display position of the to-be-displayed object is configured according to the system default configuration or configured by the user, the user sees the same boundary distribution of the display space in the VR scene every time; and if the display position of the to-be-displayed object is configured randomly, the user sees a different boundary distribution of the display space in the VR scene configured time.

In the embodiments of the present disclosure, based on the display position of each of the to-be-displayed objects and the initial position of the user in the VR scene, the space boundary is defined to create a display space respectively for the user and each of the to-be-displayed objects, so that for each of the to-be-displayed objects, the to-be-displayed object is displayed in the display space for the to-be-displayed object. In addition, a 3D Thiessen space division method is further provided to divide the space in the VR scenes regularly. With the present disclosure, the user can feel multiple spaces, and the user, when interacting with a to-be-displayed object, feels like interacting with the to-be-displayed object in two different spaces, thereby getting a sense of space immersion all the time.

Figure 6:
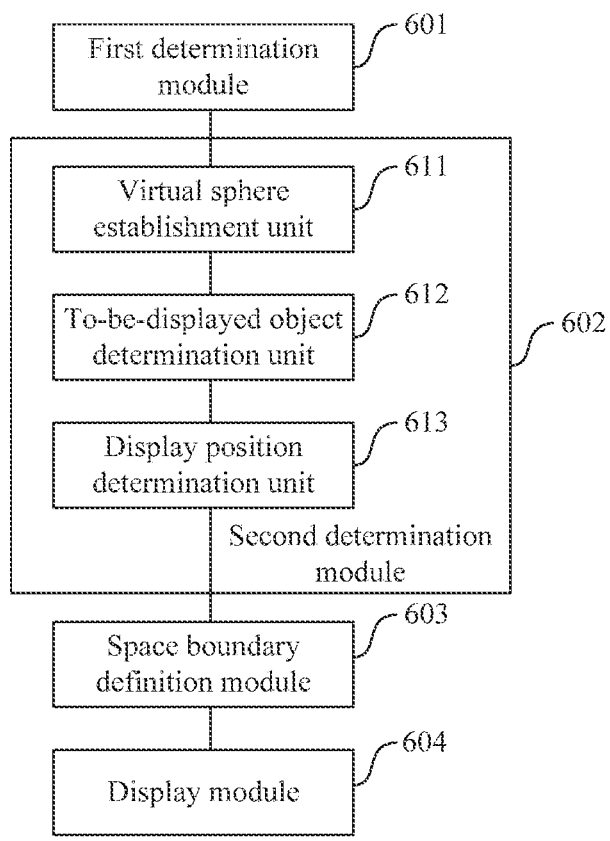
FIG. 6 shows a schematic structural diagram of an apparatus for displaying content according to another embodiment of the present disclosure.

FIG. 6 shows a schematic structural diagram of an apparatus for displaying content according to another embodiment of the present disclosure. The apparatus may include a first determination module 601, a second determination module 602, a space boundary definition module 603 and a display module 604.

The first determination module 601 is configured to determine an initial position of a user in a VR scene.

The second determination module 602 is configured to determine one or more to-be-displayed objects in the VR scene and a display position of each of the to-be-displayed objects in the VR scene.

The second determination module 602 may include a virtual sphere establishment unit 611, a to-be-displayed object determination unit 612, and a display position determination unit 613.

The virtual sphere establishment unit 611 is configured to determine the initial position of the user as a center position and establish a virtual sphere with the center position as a center.

In order to enable the user to obtain a better viewing experience, the to-be-displayed object is displayed within a best viewing distance range of the user. In an embodiment, the display position of the to-be-displayed object may be arranged on a surface of a virtual sphere which is established with the initial position of the user as the center of the virtual sphere and the best viewing distance of the user as the radius of the virtual sphere. The best viewing distance of the user may be configured according to a default best viewing distance or be configured by the user.

The radius of the virtual sphere is determined based on the viewing distance of the user. In practices, to ensure a that the user obtains the best visual experience, the virtual sphere establishment unit 611 may be configured to:

determine the initial position of the user as a center position;

determine whether the user sets a user viewing distance;

establish a virtual sphere with the center position as the center of the virtual sphere and with the user viewing distance as the radius of the virtual sphere if the user sets the user viewing distance; and establish a virtual sphere with the center position as the center of the virtual sphere and with the default viewing distance as the radius of the virtual sphere if the user does not set the user viewing distance.

The to-be-displayed object determination unit 612 is configured to determine one or more to-be-displayed objects in the VR scene.

The display position determination unit 613 is configured to determine a display position of each of the to-be-displayed objects on the surface of the virtual sphere.

By arranging the display position of each of the to-be-displayed objects on the surface of the virtual sphere which is established with the user viewing distance as the radius, the user obtains the best viewing experience.

Further, in a case that there are multiple to-be-displayed objects, in order to ensure an even space distribution in the VR scene to prevent the user from feeling that the to-be-displayed objects are crowded and chaotically arranged on the surface of the virtual sphere, in some embodiments, the display position determination unit 613 may be configured to:

determine the number of the one or more to-be-displayed objects;

evenly divide, based on the number of the one or more to-be-displayed objects, the surface of the virtual sphere into reference regions, where the number of the reference regions is equal to the number of the one or more to-be-displayed objects; and determine, for each of the to-be-displayed objects, a reference region and a display position in the reference region.

For each of the to-be-displayed objects, after the reference region is determined, the display position in the reference region is determined. In an embodiment, the process of determining, for each of the to-be-displayed objects, a reference region and a display position in the reference region may include:

for each of the to-be-displayed objects,
  randomly determine a reference region for the to-be-displayed object; and
  randomly acquire a reference position in the reference region as the display position of the to-be-displayed object.

The space boundary definition module 603 is configured to define, based on the display position of each of the to-be-displayed objects and the initial position of the user, a space boundary respectively for the user and each of the to-be-displayed objects in the VR scene to create a display space respectively for the user and each of the to-be-displayed objects.

Since the display position of each of the to-be-displayed objects is determined on the surface of the virtual sphere, the defined space boundaries for the to-be-displayed objects intersect at the center of the virtual sphere. In addition, for each of the display spaces, the user faces the perpendicular bisecting plane of the line segment connecting the display space and the center of the virtual sphere, the user always faces the to-be-displayed object that the user turns to.

The display module 604 is configured to display, for each of the to-be-displayed objects, the to-be-displayed object in the display space for the to-be-displayed object.

In the embodiments of the present disclosure, in order to distribute the display spaces for the to-be-displayed objects evenly and regularly to meet the viewing experience of the user, a virtual sphere with the center position of the user as the center is established, and the radius of the virtual sphere is configured based on the viewing distance of the user to be within a comfortable distance for the user to watch. Thus, the display position of each of the to-be-displayed objects is arranged on the surface of the virtual sphere, and the reference region for each of the to-be-displayed objects is obtained by evenly dividing the surface of the virtual sphere, ensuring an even and regular distribution of the display space in the VR scene, thereby improving the viewing experience of the user.

Figure 7:
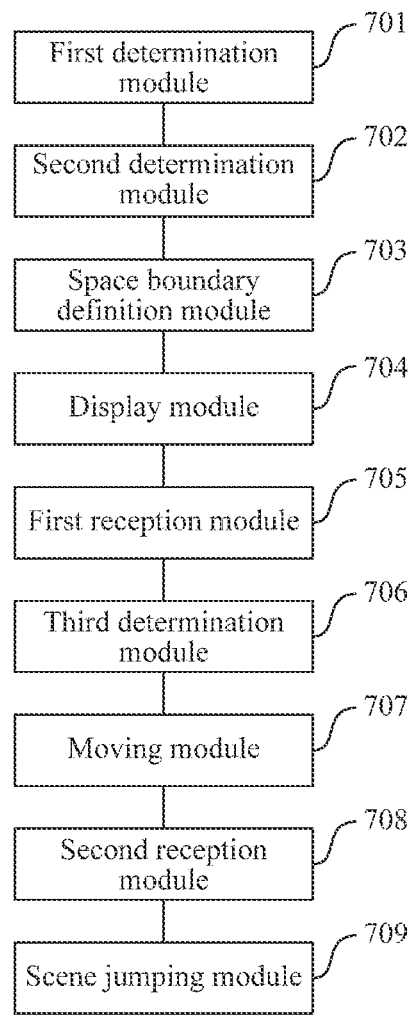
FIG. 7 shows a schematic structural diagram of an apparatus for displaying content according to another embodiment of the present disclosure.

FIG. 7 shows a schematic structural diagram of an apparatus for displaying content according to another embodiment of the present disclosure. The apparatus may include a first determination module 701, a second determination module 702, a space boundary definition module 703, a display module 704, a first reception module 705, a third determination module 706, a moving module 707, a second reception module 708 and a scene jumping module 709.

The first determination module 701 is configured to determine an initial position of a user in a VR scene.

The second determination module 702 is configured to determine one or more to-be-displayed objects in the VR scene and a display position of each of the to-be-displayed objects in the VR scene.

The space boundary definition module 703 is configured to define, based on the display position of each of the to-be-displayed objects and the initial position of the user, a space boundary respectively for the user and each of the to-be-displayed objects in the VR scene to create a display space respectively for the user and each of the to-be-displayed objects.

The display module 704 is configured to display, for each of the to-be-displayed objects, the to-be-displayed object in the display space for the to-be-displayed object.

The first reception module 705 is configured to receive an interaction request from the user for any one of the to-be-displayed objects.

The third determination module 706 is configured to determine the to-be-displayed object as an interaction object.

The moving module 707 is configured to move the interaction object in a form to the display space for the user.

Based on the interaction request, the VR device determines the to-be-displayed object as an interaction object. The interaction object, wrapped in a 3D component such as a transparent sphere (like a crystal ball), is moved to the display space for the user. The interaction object may be wrapped in a 3D component such as a gift box and a golden egg to be moved to the display space for the user. The interaction object may be moved in any form, which is not limited herein.

The second reception module 708 is configured to receive a triggering request generated by the user for the interaction object.

The scene jumping module 709 is configured to jump to a VR scene generated by the interaction object in response to the triggering request.

In practices, in a case that the interaction object selected by the user is moved to the display space for the user, the display space for the interaction object may be automatically occupied by multiple display spaces around the display space, which follows the rule according to the 3D Thiessen Space division method. In some embodiments, based on the moving module 707, the apparatus may further include a first space boundary re-definition module and a first re-display module.

The first space boundary re-definition module is configured to define, based on the initial position of the user and the display position of each of the to-be-displayed objects except the interaction object, the space boundary respectively for the user and the to-be-displayed objects except the interaction object in the VR scene to create a display space respectively for the user and each of the to-be-displayed objects except the interaction object.

The first re-display module is configured to display, for each of the to-be-displayed objects except the interaction object, the to-be-displayed object in the display space for the to-be-displayed object.

It should be understood that, the user may add or delete a to-be-displayed object according to actual requirements. For example, in a case that the user downloads or uninstalls an application, it is required to add or delete the application, and it is required to create a display space for the application or delete a display space for the application, which follows the rule according to the 3D Thiessen space division method.

In some embodiments, based on the display module 704, the apparatus may further include a to-be-added display object determination module, a second space boundary re-definition module and a second re-display module.

The to-be-added display object determination module is configured to determine a to-be-added display object in the VR scene and a display position of the to-be-added display object in the VR scene.

The second space boundary re-definition module is configured to define, based on the display position of each of the to-be-displayed objects, the display position of the to-be-added display object and the initial position of the user, the space boundary respectively for the user, each of the to-be-displayed objects and the to-be-added display object in the VR scene to create a display space respectively for the user, each of the to-be-displayed objects and the to-be-added display object.

The second re-display module is configured to display, for each of the to-be-displayed objects, the to-be-displayed object in the display space for the to-be-displayed object, and display the to-be-added display object in the display space for the to-be-added display object.

In practices, the display position of the to-be-added display object may be determined by the user or be randomly matched. Corresponding to the determination process by the user, the user in the VR scene may throw the to-be-added display object to a position on the surface of the virtual sphere or to a position in the VR scene. The position where the to-be-added display object stops is determined as the display position of the to-be-added display object. Based on the space boundary division method according to any one of the above embodiments, the space boundary for each of the to-be-displayed objects is defined to determine the display space for each of the to-be-displayed objects. Corresponding to the above process, in the VR scene, a new display space may be created automatically at the position where the to-be-added display object stops, and multiple original display spaces around the new display space automatically shrink the space boundaries until the boundary of the new display space meets the rule according to the 3D Thiessen space division method.

In some embodiments, based on to the display module 704, the apparatus may further include a to-be-deleted object determination module, a third space boundary re-definition module and a third re-display module.

The to-be-deleted object determination module is configured to determine a to-be-deleted object in the one or more to-be-displayed objects.

The third space boundary re-definition module is configured to define, based on the initial position of the user and the display position of each of the to-be-displayed objects except the to-be-deleted object, a space boundary respectively for the user and each of the to-be-displayed objects except the to-be-deleted object in the VR scene to create a display space respectively for the user and each of the to-be-displayed objects except the to-be-deleted object.

The third redisplay module is configured to display, for each of the to-be-displayed objects except the to-be-deleted object, the to-be-displayed object in the display space for the to-be-displayed object.

In a case that the user wants to delete a to-be-displayed object displayed in the current VR scene, the user may trigger a deletion operation for the to-be-displayed object. The deletion operation may be performed by throwing, by the user, a special effect bomb to the display space for the to-be-deleted object. When the special effect bomb explodes, the display space is blown up and the to-be-deleted object corresponding to the display space disappears. The display space for the to-be-deleted object is automatically occupied by multiple display spaces around the display space. Apparently, the above process is only a special effect of the deletion operation, which is not limited to the above process. The deletion operation follows the rule according to the 3D Thiessen space division method.

In practices, the user may configure and modify the display form of any one of the to-be-displayed objects and the theme of the display space for any one of the to-be-displayed objects, and the user may add or delete any one of the to-be-displayed objects, which are not limited herein.

It should be understood that, if the user is not satisfied with the display position of any one of the to-be-displayed objects displayed currently, the user may change the display position of the to-be-displayed objects according to the user's wishes. Based on the display module 704, the apparatus may further include a third reception module, a fourth determination module, a fourth space boundary re-definition module, and a fourth re-display module.

The third reception module is configured to receive a movement request from the user for any one of the to-be-displayed objects.

The fourth determination module is configured to determine a moving position of the to-be-displayed object and determine the moving position as the display position of the to-be-displayed object.

The fourth space boundary re-definition module is configured to define, based on the display position of each of the to-be-displayed objects and the initial position of the user, the space boundary respectively for the user and each of the to-be-displayed objects in the VR scene to update the display space respectively for the user and each of the to-be-displayed objects.

The fourth re-display module is configured to display, for each of the to-be-displayed objects, the to-be-displayed object in the updated display space for the to-be-displayed object.

In an actual VR scene, the user may directly move a to-be-displayed object to a display position required by the user. The original display space for the to-be-displayed object is automatically filled by multiple display spaces around the to-be-displayed object. At the display position of the to-be-displayed object after being moved, the display spaces around the moved to-be-displayed object automatically shrinks until the boundary of a new space for the moved to-be-displayed object meets the rule according to the 3D Thiessen space division method.

After the to-be-displayed object is moved in the above way and the display position of each of the to-be-displayed objects is automatically configured, the current configuration by the user may be saved. In some embodiments, the apparatus may be further configured to:

save, for each of the to-be-displayed objects, the display position of the to-be-displayed object configured by the user to display the to-be-displayed object at the display position configured by the user every time.

The process of saving, for each of the to-be-displayed objects, the display position of the to-be-displayed object configured by the user indicates that the space division in the VR scene is saved, such that the to-be-displayed object may be displayed in the VR scene according to a fixed space division.

The apparatus for displaying content according to the embodiments of the present disclosure may be applied to a Launcher (an android desktop) interface or a menu interface of a game, and space games such as a space maze game may be developed based on the apparatus. With the apparatus, the user in the VR scene can experience a sense of space that cannot be experienced in the real world, and the advantages of VR devices are fully utilized, achieving the superiority that cannot be achieved by the conventional technology. With the apparatus, the user in the VR scene is in a 3D space without facing a flat console, as if in space and facing the infinite universe, thereby getting a better sense of space immersion.

Figure 8:
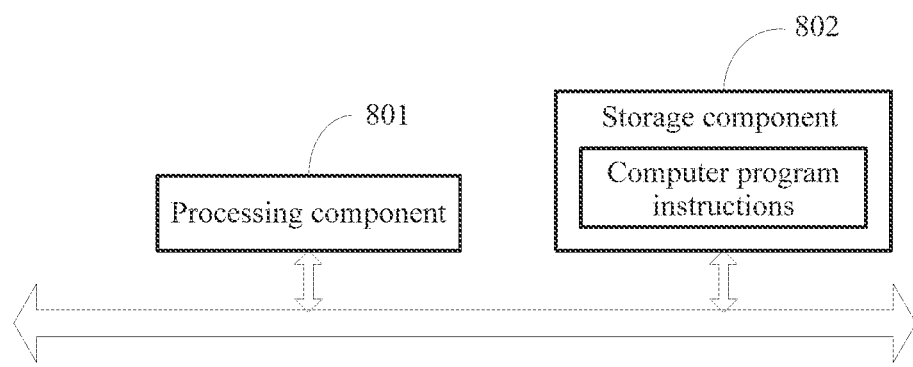
FIG. 8 shows a schematic structural diagram of a device for displaying content according to an embodiment of the present disclosure.

FIG. 8 shows a schematic structural diagram of a device for displaying content according to an embodiment of the present disclosure. The device may include a processing component 801 and a storage component 802. The storage component 802 is configured to store one or more computer program instructions.

The processing component 801 is configured to invoke and execute the one or more computer program instructions to:

determine an initial position of a user in a VR scene; determine one or more to-be-displayed objects in the VR scene and a display position of each of the to-be-displayed objects in the VR scene; define, based on the display position of each of the to-be-displayed objects and the initial position of the user, a space boundary respectively for the user and each of the to-be-displayed objects in the VR scene to create a display space respectively for the user and each of the to-be-displayed objects; and display, for each of the to-be-displayed objects, the to-be-displayed object in the display space for the to-be-displayed object.

In an embodiment, the processing component 801 is further configured to execute all or part of the steps of the method according to the above embodiments of the present disclosure.

The processing component 801 may include one or more processors to execute computer instructions. The processing component 801 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to perform the method.

The storage component 802 may be implemented by any type of volatile or non-volatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic disk or an optical disk.

The electronic device may include other components, such as an input/output interface and a communication component. The input/output interface provides an interface between the processing component and a peripheral interface module. The peripheral interface module may be an output device, an input device, or the like.

Those skilled in the art may clearly understand that, for convenience and brevity of description, for a detailed working process of the foregoing system, apparatus and unit, reference may be made to a corresponding process in the foregoing method embodiments, which is not repeated herein The apparatus embodiments described above are merely illustrative. A unit described as a separate component may be or may not be physically separated, and a component displayed as a unit may be or may not be a physical unit, that is, it may be placed in a same position or may be distributed in multiple networked units. The object of the solutions in the embodiments may be realized by selecting a part or all of the modules based on actual requirements. Those skilled in the art may understand and implement the present disclosure without creative work.

Based on the descriptions of the embodiments, those skilled in the art can clearly understand that the implementations may be implemented by software and a necessary general hardware platform, or may be implemented by hardware. Based on this understanding, the essence of the above technical solutions or the parts contributing to the conventional technology of t the above technical solutions may be implemented as a software product. The software product may be stored in a computer readable storage medium, such as a ROM/RAM, a diskette and an optical disk. The software product includes multiple instructions enabling a computer device (such as a personal computer, a server, or a network device) to perform the method described in the embodiments or in parts of the embodiments.

Finally, it should be noted that the above embodiments are merely provided for describing the technical solutions of the present disclosure, but are not intended to limit the present disclosure, Although the present disclosure is described in detail with reference to the foregoing embodiments, those skilled in the art should understand that, they can still modify technical solutions described in the foregoing embodiments, or make equivalent substitutions to a part or all of the technical features. The modifications or substitutions do not enable the essence of corresponding technical solutions to depart from the spirit and scope of the technical solutions in the embodiments of present disclosure.

The invention claimed is:

1. A method for displaying content for three-dimensional scene, comprising:
   determining an initial position of a user in a VR scene;
   determining one or more to-be-displayed objects in the VR scene and a display position of each of the to-be-displayed objects in the VR scene;
   defining, based on the display position of each of the to-be-displayed objects and the initial position of the user, a space boundary respectively for the user and each of the to-be-displayed objects in the VR scene to create a display space respectively for the user and each of the to-be-displayed objects; and
   for each of the to-be-displayed objects, displaying the to-be-displayed object in the display space for the to-be-displayed object;
   wherein the defining, based on the display position of each of the to-be-displayed objects and the initial position of the user, a space boundary respectively for the user and each of the to-be-displayed objects in the VR scene to create a display space respectively for the user ad each of the to-be-displayed object comprises:
   defining, for each of the to-be-displayed objects, the display position of the to-be-displayed object as a target point, and defining the initial position of the user as a center point;
   determining a space boundary for each of target points by using a 3D Thiessen space division method;
   defining, for each of the target points, the space boundary for the center point by a perpendicular bisecting plane of a line segment connecting the target point and the center point; and
   creating, based on the space boundary for each of the target points and the space boundary for the center point, the display space respectively for the user and each of the to-be-displayed objects.

2. The method according to claim 1, wherein the determining one or more to-be-displayed objects in the VR scene and a display position of each of the to-be-displayed objects in the VR scene comprises:
   determining the initial position of the user as a center position, and establishing a virtual sphere with the center position as a center, wherein a radius of the virtual sphere is determined based on a viewing distance of the user;
   determining the one or more to-be-displayed objects in the VR scene; and
   determining a display position of each of the to-be-displayed objects on a surface of the virtual sphere.

3. The method according to claim 2, wherein the determining a display position of each of the to-be-displayed objects on a surface of the virtual sphere comprises:
   determining the number of the one or more to-be-displayed objects;
   evenly dividing, based on the number of the one or more to-be-displayed objects, the surface of the virtual sphere into reference regions, wherein the number of the reference regions is equal to the number of the one or more to-be-displayed objects; and
   determining, for each of the to-be-displayed objects, a reference region and a display position in the reference region.

4. The method according to claim 3, wherein the determining, for each of the to-be-displayed objects, a reference region and a display position in the reference region comprises:
   for each of the to-be-displayed objects,
   randomly determining a reference region for the to-be-displayed object; and
   randomly acquiring a reference position in the reference region as the display position of the to-be-displayed object.

5. The method according to claim 1, wherein the determining a space boundary for each of the target points by using a 3D Thiessen space division method comprises:
   constructing a virtual triangulation based on all the target points by using a Delaunay triangulation method;
   generating, for each of triangles in the virtual triangulation, a perpendicular bisecting plane of each of sides of the triangle; and
   defining, for each of the target points, the space boundary for the target point by a perpendicular bisecting plane around the target point.

6. The method according to claim 1, wherein after the displaying, for each of the to-be-displayed objects, the to-be-displayed object in the display space for the to-be-displayed object, the method further comprises:
- determining a to-be-added display object in the VR scene and a display position of the to-be-added display object in the VR scene;
- defining, based on the display position of each of the to-be-displayed objects, the display position of the to-be-added display object and the initial position of the user, the space boundary respectively for the user, each of the to-be-displayed objects and the to-be-added display object in the VR scene to create a display space respectively for the user, each of the to-be-displayed objects and the to-be-added display object; and
- displaying, for each of the to-be-displayed objects, the to-be-displayed object in the display space for the to-be-displayed object, and displaying the to-be-added display object in the display space for the to-be-added display object.

7. The method according to claim 1, wherein after the displaying, for each of the to-be-displayed objects, the to-be-displayed object in the display space for the to-be-displayed object, the method further comprises:
- determining a to-be-deleted object in the one or more to-be-displayed objects;
- defining, based on the initial position of the user and the display position of each of the to-be-displayed objects except the to-be-deleted object, the space boundary respectively for the user and each of the to-be-displayed objects except the to-be-deleted object in the VR scene to create a display space respectively for the user and each of the to-be-displayed objects except the to-be-deleted object; and
- displaying, for each of the to-be-displayed objects except the to-be-deleted object, the to-be-displayed object in the display space for the to-be-displayed object.

8. The method according to claim 1, wherein the displaying, for each of the to-be-displayed objects, the to-be-displayed object in the display space for the to-be-displayed object comprises:
- for each of the to-be-displayed objects,
  - determining a display form for the to-be-displayed object; and
  - fixedly displaying the to-be-displayed object in the display form at a display position in the display space for the to-be-displayed object, or dynamically displaying the to-be-displayed object in the display form at a display position in the display space for the to-be-displayed object.

9. The method according to claim 8, wherein the display form comprises a three-dimensional model, a thumbnail, or an animation.

10. The method according to claim 1, wherein after the displaying, for each of the to-be-displayed objects, the to-be-displayed object in the display space for the to-be-displayed object, the method further comprises:
- receiving a movement request from the user for any one of the to-be-displayed objects;
- determining a moving position of the to-be-displayed object and determining the moving position as the display position of the to-be-displayed object;
- defining, based on the display position of each of the to-be-displayed objects and the initial position of the user, the space boundary respectively for the user and each of the to-be-displayed objects in the VR scene to update the display space for the user and the display space for each of the to-be-displayed objects; and
- displaying, for each of the to-be-displayed objects, the to-be-displayed object in the updated display space for the to-be-displayed object.

11. The method according to claim 10, further comprising:
- saving, for each of the to-be-displayed objects, the display position of the to-be-displayed object configured by the user to display the to-be-displayed object at the display position configured by the user every time.

12. The method according to claim 1, wherein after the displaying, for each of the to-be-displayed objects, the to-be-displayed object in the display space, the method further comprises:
- receiving an interaction request from the user for any one of the to-be-displayed objects;
- determining the to-be-displayed object as an interaction object;
- moving the interaction object in a form to the display space for the user;
- receiving a trigger request generated by the user for the interaction object; and
- jumping to a VR scene generated by the interaction object in response to the triggering request.

13. The method according to claim 12, wherein after the moving the interaction object in a form to the display space for the user, the method further comprises:
- defining, based on the initial position of the user and the display position of each of the to-be-displayed objects except the interaction object, the space boundary respectively for the user and each of the to-be-displayed objects except the interaction object in the VR scene to create a display space respectively for the user and each of the to-be-displayed objects except the interaction object; and
- displaying, for each of the to-be-displayed objects except the interaction object, the to-be-displayed object in the display space for the to-be-displayed object.

14. The method according to claim 1, wherein the displaying, for each of the to-be-displayed objects, the to-be-displayed object in the display space for the to-be-displayed object comprises:
- for each of the to-be-displayed objects,
  - determining a display theme for the display space of the to-be-displayed object;
  - determining, based on the display theme for the display space, a display form for the to-be-displayed object corresponding to the display space; and
  - displaying the to-be-displayed object in the display form in the display space configured based on the display theme.

15. An apparatus for displaying content for three-dimensional scene, comprising:
- a first determination module, configured to determine an initial position of a user in a VR scene;
- a second determination module, configured to determine one or more to-be-displayed objects in the VR scene and a display position of each of the to-be-displayed objects in the VR scene;
- a space boundary definition module, configured to define, based on the display position of each of the to-be-displayed objects and the initial position of the user, a space boundary respectively for the user and each of the to-be-displayed objects in the VR scene to create a display space respectively for the user and each of the to-be-displayed objects; and a display module, configured to display, for each of the to-be-displayed objects, the to-be-displayed object in the display space for the to-be-displayed object;

wherein the space boundary definition module is further configured to:

define, for each of the to-be-displayed objects, the display position of the to-be-displayed object as a target point, and defining the initial position of the user as a center point;

determine a space boundary for each pf target points by using a 3D Thiessen space division method;

define, for each of the target points, the space boundary for the center point by a perpendicular bisecting plane if a line segment connecting the target point and the center point; and create, based on the space boundary for each of the target points and the space boundary for the center point, the display space respectively for the user and each of the to-be-displayed objects.

16. A device for displaying content for three-dimensional scene, comprising a processing component and a storage component, wherein the storage component stores one or more computer program instructions, and the processing component is configured to invoke and execute the one or more computer program instructions to:

determine an initial position of a user in a VR scene;

determine one or more to-be-displayed objects in the VR scene and a display position of each of the to-be-displayed objects in the VR scene;

define, based on the display position of each of the to-be-displayed objects and the initial position of the user, a space boundary respectively for the user and each of the to-be-displayed objects in the VR scene to create a display space respectively for the user and each of the to-be-displayed objects; and display, for each of the to-be-displayed objects, the to-be-displayed object in the display space for the to-be-displayed object;

wherein the processing component is further configured to invoke and execute the one or more computer program instructions to:

define, for each of the to-be-displayed objects, the display position of the to-be-displayed objects as a target point, and defining the initial positions of the user as a center point;

determine a space boundary for each of target points by user a 3D Thiessen space division method;

define, for each of the target points, the space boundary for the center point by a perpendicular bisecting plane of a line segment connecting the target point and the center point; and create, based on the space boundary for each of the target points and the space boundary for the center point, the display space respectively for the user and each pf the to-be-displayed objects.

* * * * *